US006901491B2

(12) United States Patent
Kohn et al.

(10) Patent No.: US 6,901,491 B2
(45) Date of Patent: May 31, 2005

(54) METHOD AND APPARATUS FOR INTEGRATION OF COMMUNICATION LINKS WITH A REMOTE DIRECT MEMORY ACCESS PROTOCOL

(75) Inventors: Leslie D. Kohn, Fremont, CA (US); Michael K. Wong, San Mateo, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 257 days.

(21) Appl. No.: 10/272,784

(22) Filed: Oct. 16, 2002

(65) Prior Publication Data

US 2003/0097518 A1 May 22, 2003

Related U.S. Application Data

(60) Provisional application No. 60/345,315, filed on Oct. 22, 2001.

(51) Int. Cl.[7] ......................... G06F 12/16; G06F 13/00
(52) U.S. Cl. ............................. 711/157; 711/5; 712/10; 712/11; 712/14; 714/11; 709/212; 709/214; 709/216
(58) Field of Search .................................. 709/214, 216, 709/212; 711/5, 157; 712/10, 11, 14; 714/11

(56) References Cited

U.S. PATENT DOCUMENTS

| | | | |
|---|---|---|---|
| 4,096,571 A | * 6/1978 | Vander Mey ................ 711/151 |
| 4,754,394 A | 6/1988 | Brantley, Jr. et al. |
| 5,671,377 A | * 9/1997 | Bleidt et al. ................. 345/723 |
| 6,151,685 A | * 11/2000 | Li et al. ......................... 714/6 |
| 6,567,839 B1 | 5/2003 | Borkenhagen et al. |
| 6,567,900 B1 | * 5/2003 | Kessler ....................... 711/157 |
| 2002/0065998 A1 | 5/2002 | Buckland |
| 2003/0229684 A1 | * 12/2003 | Armstrong et al. ......... 709/219 |

OTHER PUBLICATIONS

DELL–COM, "Infiniband Architecture: Next–Generation Server I/O," White Paper, Oct. 2000, pp. 1–10.
Kunle Olukotun, Basem A. Nayfeh, Lance Hammond, Ken Wilson and Kunyung Chang, "The Case For A Single–Chip Multiprocessor," ACM Sigplan Notices, Association for Computing Machinery, New York, US vol. 31, No. 9, Sep. 1, 1996 pp. 2–11.
Darrell D.E. Long, Bruce R. Montague, Luis–Felipe Cabrera, "Swift/RAID: A Distributed RAID System," Computing Systems, Usenix Association, Berkeley, CA, U.S. 1994 pp. 333–359.
Pankaj Gupta, Nick McKeown, "Designing and Implementing A Fast Crossbar Scheduler", 1999, *IEEE*.

* cited by examiner

*Primary Examiner*—Jack A. Lane
(74) *Attorney, Agent, or Firm*—Martine Penilla & Gencarella, LLP

(57) ABSTRACT

In one embodiment, a server is provided. The server includes multiple application processor chips. Each of the multiple application processor chips includes multiple processing cores. Multiple memories corresponding to the multiple processor chips are included. The multiple memories are configured such that one processor chip is associated with one memory. A plurality of fabric chips enabling each of the multiple application processor chips to access any of the multiple memories are included. The data associated with one of the multiple application processor chips is stored across each of the multiple memories. In one embodiment, the application processor chips include a remote direct memory access (RDMA) and striping engine. The RDMA and striping engine is configured to store data in a striped manner across the multiple memories. A method for allowing multiple processors to exchange information through horizontal scaling is also provided.

20 Claims, 5 Drawing Sheets

METHOD AND APPARATUS FOR INTEGRATION OF COMMUNICATION LINKS WITH A REMOTE DIRECT MEMORY ACCESS PROTOCOL

CROSS REFERENCE TO RELATED APPLICATIONS

This application claims priority from U.S. Provisional Patent Application No. 60/345,315 filed Oct. 22, 2001 and entitled "High Performance Web Server". This provisional application is herein incorporated by reference.

BACKGROUND OF THE INVENTION

1. Field of the Invention

This invention relates generally to processor architecture and more particularly to information exchange between multiple processors sharing memory.

2. Description of the Related Art

Missions critical systems for enterprises require a design that emphasizes reliability. For example, for a high-end/mission critical system where there is only one instance of key components, failure of one of the key components will bring down the entire system. This would have drastic results for the owner of the system, irrespective of the applications executed by the system. Some exemplary applications requiring reliability include electronic commerce applications and commercial database applications, etc.

One attempt to address this shortcoming for mission critical systems is to provide redundant fabric which operates on a standby basis. FIG. 1 is a simplified schematic of the architecture for redundant fabric configured to operate on a standby basis. Switch 100 connects multiple central processing units (CPU) 102a–102n. Each of the multiple central processing units (CPU) 102a–102n are associated with one of memories 104a–104n. Switch fabric 100 is configured to allow any one of CPUs 102a–102n to access any of memories 104a–104n. A second instance of the key components is provided through redundant fabric illustrated by switch 100', CPUs 102a'–102n' and memories 104a'–104n'. However, this 100% redundancy through replication becomes expensive and requires significantly more overhead because the state of the system is being duplicated. That is, the costs for one system is being duplicated for a standby system.

In view of the forgoing, there is a need define a communication system within a multi-chip processor that allows the multiple processors to exchange information through horizontal scaling without using shared memory.

SUMMARY OF THE INVENTION

Broadly speaking, the present invention fills these needs by providing a communication system for a multi-chip processor that is fault tolerant and shares memory across the multi-chip processors. The fault tolerance is achieved through the addition of one module rather than through replication. It should be appreciated that the present invention can be implemented in numerous ways, including as an apparatus, a system, a device, or a method. Several inventive embodiments of the present invention are described below.

In one embodiment, a server is provided. The server includes multiple application processor chips. Each of the multiple application processor chips includes multiple processing cores. Multiple memories corresponding to the multiple processor chips are included. The multiple memories are configured such that one processor chip is associated with one memory. A plurality of fabric chips enabling each of the multiple application processor chips to access any of the multiple memories are included. The data associated with one of the multiple application processor chips is stored across each of the multiple memories. In one embodiment, the application processor chips include a remote direct memory access (RDMA) and striping engine. The RDMA and striping engine is configured to store data in a striped manner across the multiple memories.

In another embodiment, a method for allowing multiple processors to exchange information through horizontal scaling is provided. The method initiates with providing multiple processor chips having multiple processing cores. Each of the multiple processor chips is associated with a memory, such that one processor chip is associated with one memory. Then, each of the multiple processor chips is enabled to communicate with each other. Next, a block of data to be stored in memory is identified. Then, the block of data is subdivided into segments. Next, the segments are interleaved across each memory associated with each processor chip. In one embodiment, the interleaving is performed in a parity striping manner to allow for data recovery from a memory acting as a parity block.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for an apparatus and method for communicating between multiple processors on a chip efficiently, which eliminates the need for 100% redundancy. It will be obvious, however, to one skilled in the art, that the present invention may be practiced without some or all of these specific details. In other instances, well known process operations have not been described in detail in order not to unnecessarily obscure the present invention. The term about as used herein refers to a range of +/−10% of the corresponding value.

The embodiments described herein define a communication mechanism allowing the multiple processors to exchange information through horizontal scaling without using shared memory. The horizontal scaling solutions currently available are associated with high overhead, large power consumption, and high cost for redundancy related to failure reduction. In one embodiment, the invention includes 16 high speed serial links on each processor chip where each of the links are configured to send out packets independently of other links. In this embodiment, the links are connected to a set of up to 16 parallel fabric chips wherein each fabric chip is enabled to access each of the processor chips. In another embodiment, each processor chip has multiple paths to reach any of the other processor chips through a parallel crossbar, which provides scalability. Moreover, there are up to 15 redundant paths in the event a link or fabric chip fails when there are 16 high speed serial links. Of course, the number of fabric chips can be adjusted up or down to match the desired number of processors. It should be appreciated that the failure model is N+1, i.e., one extra fabric chip can cover any single point failure. In one embodiment, at least three fabric chips and links provide advantageous fault tolerance over a conventional crossbar which requires full duplication to cover any single point of failure. In another embodiment, a remote direct memory access (RDMA) mechanism is provided. The invention solves the problems associated with replication and hot spot contention by providing a redundant array of inexpensive disks (RAID) style memory aggregation. Here, a block of data is subdivided into smaller segments and the subdivided segments are interleaved across the nodes. In a particular implementation, parity striping across a number of nodes is included.

Figure 1:
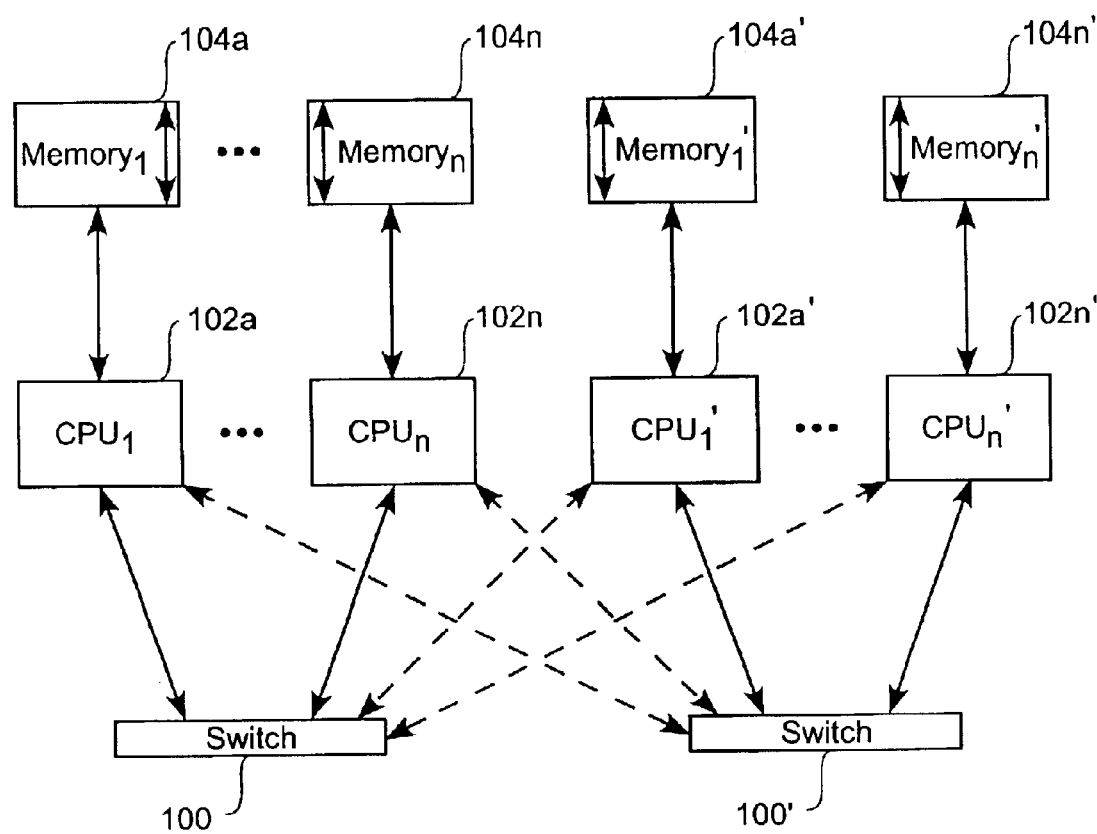
FIG. 1 is a simplified schematic of the architecture for redundant fabric configured to operate on a standby basis.
Figure 2:
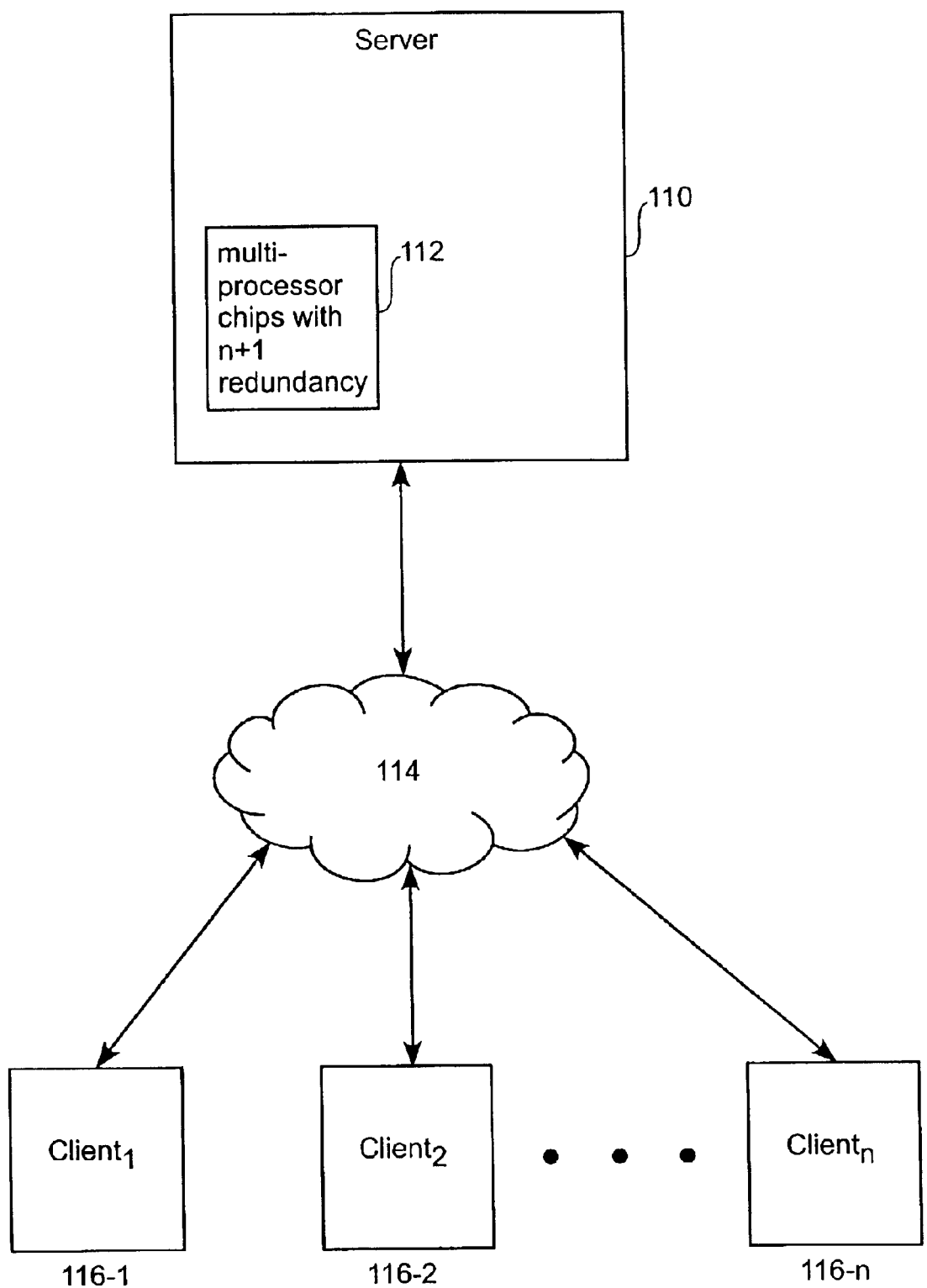
FIG. 2 is a simplified schematic diagram of a server including multiprocessor chips having multiple cores and an n+1 failure model in accordance with one embodiment of the invention.

FIG. 2 is a simplified schematic diagram of a server including multiprocessor chips having multiple cores and an n+1 failure model in accordance with one embodiment of the invention. Here, server 110 includes multiple processor chips 112 where each processor chip includes multiple processing cores. Server 110 is capable of communicating with numerous clients 116-1 through 116-n over distributed network 114, e.g., the Internet. In one embodiment, multiple processor chips 112 support memory aggregation for sharing memory across processor nodes using horizontal scaling. As will be explained further below, the data is striped across memories associated with the multiple processor chips. In another embodiment, the parity striping is used to stripe the data across memories in a similar fashion to a redundant array of inexpensive disks (RAID). Consequently, the striping allows for a large memory system to be built that is highly reliable and fault tolerant, thereby protecting against node failure, i.e., processor or memory failure. In addition, the fault tolerance is economically constructed since one extra fabric chip can cover any single point failure. It will be apparent to one skilled in the art that server 110 may be configured to run serving applications directed toward electronic commerce, web applications, database applications, etc.

Figure 3:
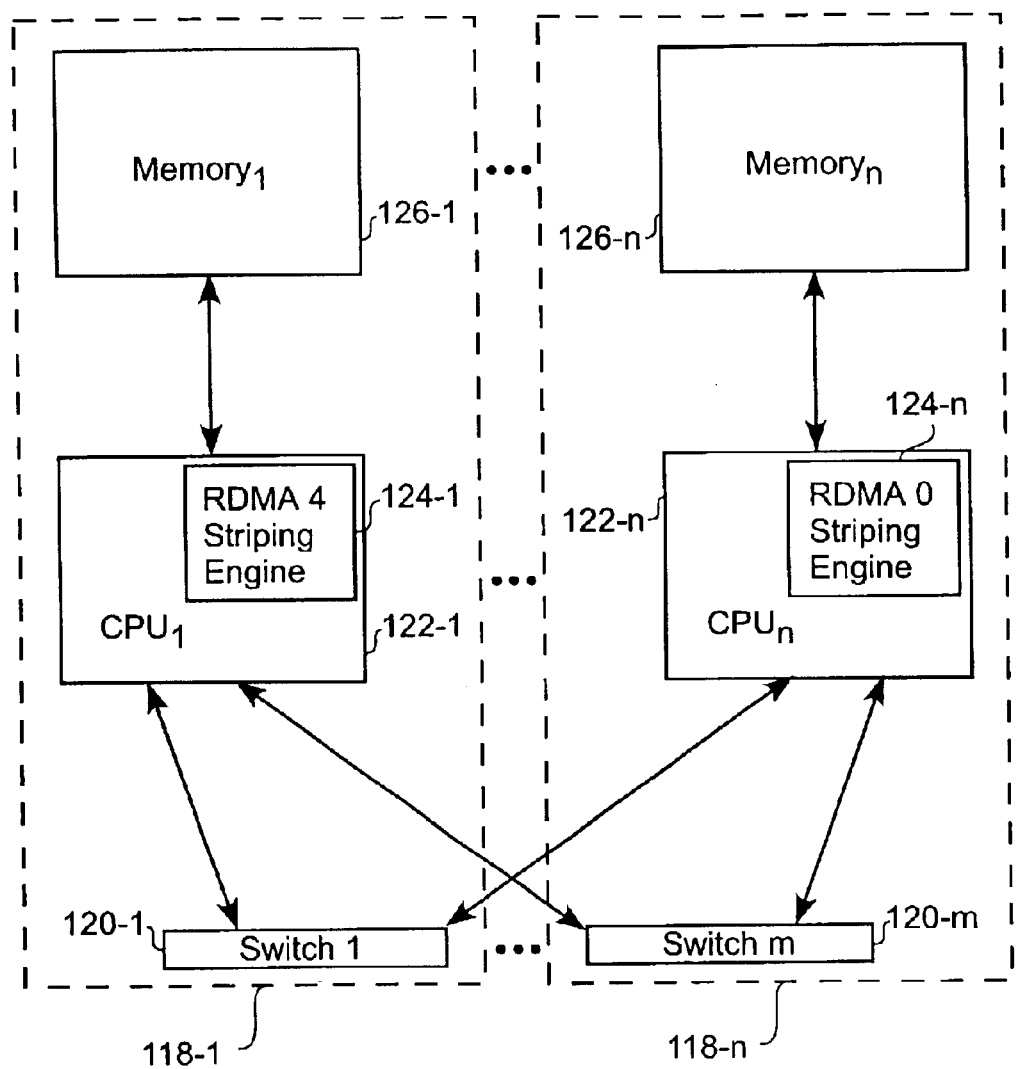
FIG. 3 is a schematic diagram of multiple central processing unit (CPU) subsystems configured to share data through a remote direct memory access (RDMA) in accordance with one embodiment of the invention.

FIG. 3 is a schematic diagram of multiple central processing unit (CPU) subsystems configured to share data through a remote direct memory access (RDMA) in accordance with one embodiment of the invention. Switch fabric chips 120-1 through 120-m provide the communication links associated with each CPU subsystem 118-1 through 118-n that enables each CPU subsystem to communicate with any other CPU subsystem. $CPU_1$ 122-1 includes RDMA and striping engine 124-1. RDMA and striping engine is configured to enable communication between CPU subsystems. That is, CPU subsystem 118-1 has access to CPU subsystem 118-n and more particularly memory 126-n of CPU subsystem 118-n. Of course, each CPU subsystem is enabled to communicate with any other CPU subsystem. RDMA and striping engines 124-1 through 124-n enable the storage of data in a distributed fashion across memories 126-1 through 126-n. In one embodiment, rather than storing data vertically in each memory, the data is stored horizontally across the memories. As used herein, storing data vertically in a memory refers to storing the data associated with a particular CPU subsystem within the memory associated with that CPU subsystem. For example, the data for CPU subsystem 118-1 would be stored in memory 126-1, i.e., one entire memory block, where the data is stored vertically. Alternatively, storing the data horizontally refers to the data for CPU 118-1 being stored in segments across memories 126-1 through 126-n.

Still referring to FIG. 3, RDMA and striping engines 124-1 through 124-n support striping. It will be apparent to one skilled in the art that striping stores the data in a distributed fashion, similar to striping for RAID systems. The striping mechanism supported by the RDMA and striping engines 124-1 through 124-n enables the storage of the data across CPU subsystems 118-1 through 118-n. Accordingly, RDMA and striping engine 124-1 through 124-n include a mechanism for calculating a parity block. As is generally known with respect to RAID systems, the parity block enables the capability to reconstruct the data in the case of a failure. Thus, for a system requiring n memory modules to store the data, n+1 memory modules are needed for the embodiments described herein to accommodate the parity memory block. It should be appreciated that the redundancy provided by the switch fabric and the data striping eliminate the need for complete duplication for a standby system.

Figure 4:
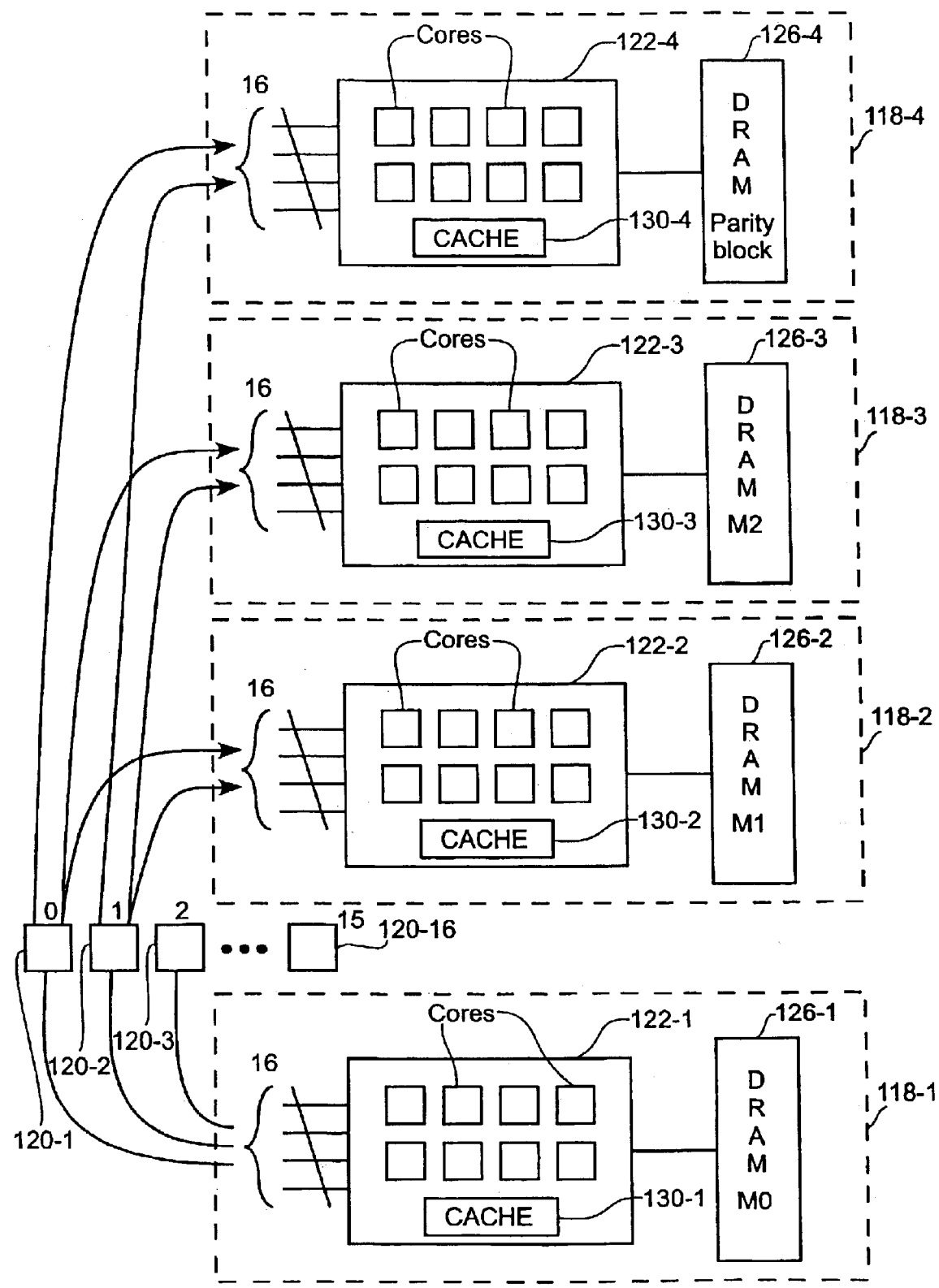
FIG. 4 is simplified schematic of four multi-core application processing chips where each processing chip includes 16 high speed serial links configured to send out data packets independently of other links in accordance with one embodiment of the invention.

FIG. 4 is simplified schematic of four multi-core application processing chips where each processing chip includes 16 high speed serial links configured to send out data packets independently of other links in accordance with one embodiment of the invention. Here, each subsystem 118-1 through 118-4 includes processing chip 112-1 through 122-4, where each processing chip includes 8 processing cores. It should be appreciated that the embodiments described herein can be applied to processing chips having one or more cores on the chip. In one embodiment, each of the cores include an RDMA and striping engine as described with reference to FIG. 3. Of course, a single RDMA and striping engine may be shared by all of the cores. In another embodiment, integrated onto each subsystem 118-1 through 118-4 are 16 high speed serial communication links. Switch fabric 120-1 through 120-16 provide access for each of the processor chips to each other. Thus, there are 15 redundant paths in the event a link or fabric chip fails. It should be appreciated that the number of fabric chips can be adjusted up or down to match the number of processor chips. Level 1 cache memories 130-1 through 130-4 are included for each processor chip 122-1 through 122-4, respectively. Processing chips 122-1 through 122-4 are in communication with dynamic random access memory (DRAM) 126-1 through 126-4, respectively. In one embodiment, DRAM memory bandwidth is provided through four 128 bit wide double data rate memory ports. In another embodiment, each of the processing cores of processing chips 122-1 through 122-4 implement the Scalable Processor Architecture (SPARC™) V9 instruction architecture.

As mentioned above, RDMA and striping engines enable memory aggregation for sharing memory across processor nodes through striped access with parity that protects against node failures. The striping allows data to be distributed across DRAMs 126-1 through 126-4 in a number of nodes, similar to a RAID configuration used for hard disk storage. Parity striping also allows for recovery of data from a failed or failing node. For illustrative purposes DRAM 126-4 is labeled as the parity block, however, any one of these memories can be designated as a parity block. In one embodiment, the parity block enables the recovery or reconstruction of data. The recovery of data from the parity block is achieved by performing an exclusive or operation and storing the data in the parity block to be used in case any systems fail.

Figure 5:
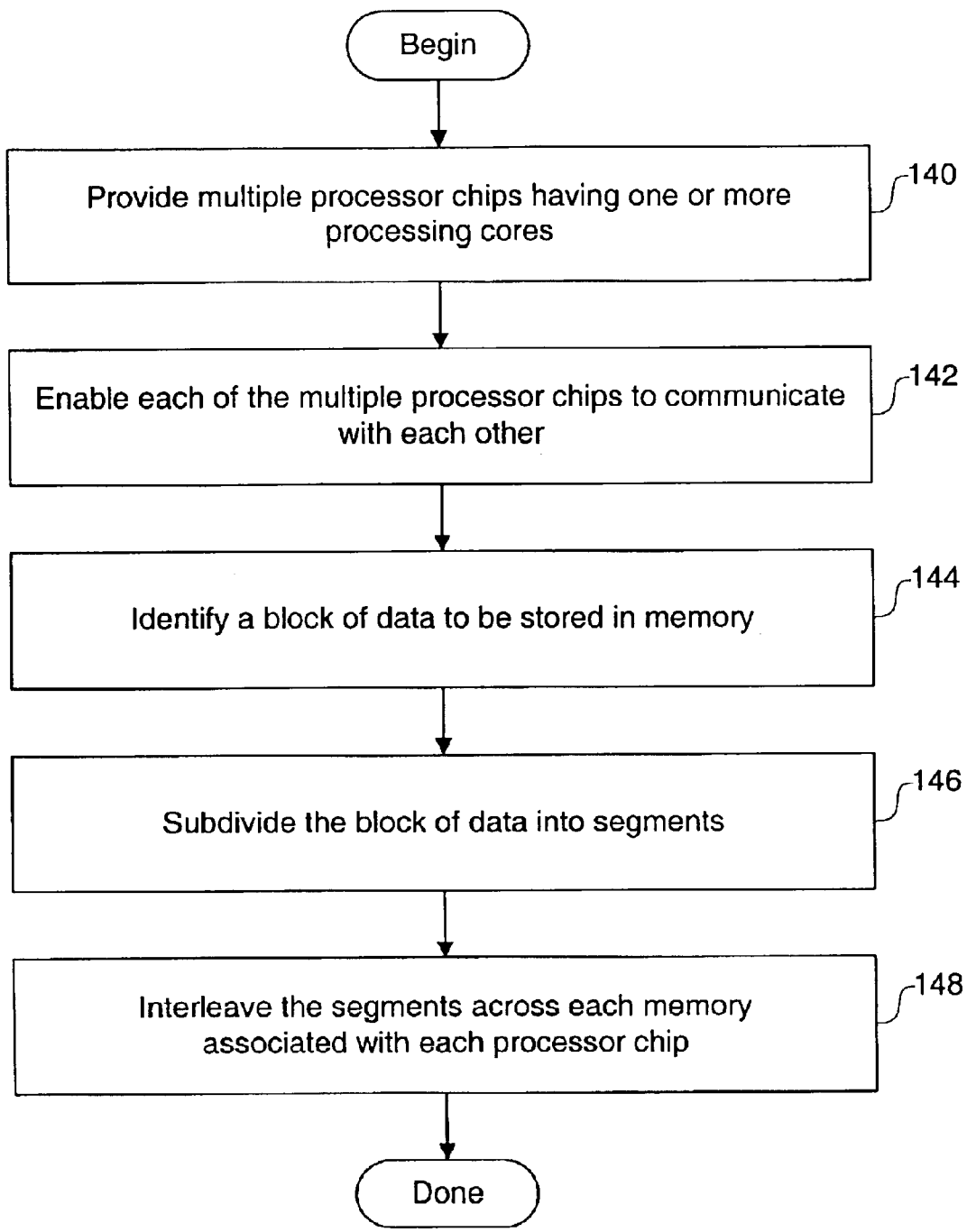
FIG. 5 is a flowchart diagram of the method operations for allowing multiple processors to exchange information through horizontal scaling in accordance with one embodiment of the invention.

FIG. 5 is a flowchart diagram of the method operations for allowing multiple processors to exchange information through horizontal scaling in accordance with one embodiment of the invention. The method initiates with method operation 140 where multiple processor chips having one or more processor cores are provided. For example, the embodiments described with reference to FIGS. 3 and 4 may be provided here. The method then advances to operation 142 where each of the multiple processor chips are enabled to communicate with each other. In one embodiment, multiple switch fabrics can accommodate this communication as illustrated with reference to FIGS. 3 and 4. The method then to operation 144 where a block of data to be stored in memory is identified. The block of data to be stored in memory is then subdivided into segments in operation 146. In one embodiment, the block of data is 4 kilobytes (KB) and is subdivided into 128 byte segments. It should be appreciated that any suitable block size and segment size may be implemented and that the embodiment having 4 KB blocks and 128 byte segments is exemplary, i.e., not meant to be limiting. The method then moves to operation 148 where the segments are interleaved across each memory associated with each processor chip. In one embodiment, a parity block is included and is calculated by the RDMA and striping engine.

In summary, the above described embodiments provide multiprocessing capability with communication links implementing an RDMA protocol. The architecture described herein allows for efficiently scaling a system beyond a single application processor chip (APC) with a minimum of extra chips and power. In one embodiment, each communication link can independently send out transaction requests. Thus, the communication links, e.g., fabric chips, provide fault tolerance since other links will continue to work in case of a failure. Furthermore, fault tolerance is provided by adding one link, i.e., n+1 failure model. Additionally, the RDMA and striping engine distributes data across memories associated with different processor chips, i.e., horizontally, and supports data striping similar to a RAID implementation. The RDMA protocol combined with the striping technique has a low degree of overhead as compared with conventional protocols. Accordingly, fault tolerance can be achieved through the above described embodiments without the costly redundancy, which in turn, translates into savings in terms of power, physical space and cost. For example, conventional technologies, such as INFINBAND, do not have a mechanism for distributing transactions across multiple links and consequently must achieve fault tolerance by adding a fully redundant set of links (2N failure model). Moreover, the invention inherently balances the load due to the distribution of the data over multiple system, i.e., the striping. Therefore, the severity of hot spot contention is substantially minimized.

Furthermore the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A server, comprising:
    multiple application processor chips, each of the multiple application processor chips having multiple processing cores;
    a cache memory region located on each of the multiple application processor chips;
    semiconductor based memory regions corresponding to each of the multiple application processor chips, the semiconductor based memory regions in direct communication with the corresponding application processor chip; and
    a plurality of fabric chips enabling each of the multiple application processor chips to access any of the semiconductor based memory regions, each of the plurality of fabric chips providing a redundant communication path between the multiple application processor chips wherein data associated with one of the multiple application processor chips is stored across each of the semiconductor based memory regions.

2. The server of claim 1, wherein each of the multiple processor chips include,
    a remote direct memory access (RDMA) and striping engine located within each of the processing cores, the RDMA and striping engine configured to store data in a striped manner across the semiconductor based memory regions.

3. The server of claim 1, wherein one of the semiconductor based memory regions functions as a parity block for data recovery.

4. The server of claim 3, wherein the data in the parity block is recreated through an exclusive OR operation.

5. The server of claim 3, wherein a failure model of n+1 for the application processor chips is achieved through the parity block.

6. The server of claim 1, wherein a number of application processor chips is equal to four, a number of processing cores on each application processing chip is equal to 8, and a number of fabric chips is equal to 16.

7. The server of claim 1 wherein the semiconductor based memory regions are dynamic random access memories.

8. The server of claim 1, wherein the processing cores are based on Scalable Processor Architecture.

9. The server of claim 1, wherein a number of fabric chips is equal to a number of application processor chips.

10. A method for allowing multiple processors to exchange information through horizontal scaling, comprising:

provrid ing multiple processor chips having multiple processing cores, each of the multiple processor chips associated with a semiconductor based memory, such that one processor chip is associated with one semiconductor based memory;

enabling each of the multiple processor chips to communicate directly with each other over a plurality of redundant communication paths;

identifying a block of data to be stored in the semiconductor based memory;

subdividing the block of data into segments; and interleaving the segments across each semiconductor based memory associated with each processor chip.

11. The method of claim 10, wherein the method operation of interleaving the segments across each memory associated with each processor chip includes, parity striping the segments to allow for data recovery.

12. The method of claim 10, wherein the method operation of enabling each of the multiple processor chips to communicate directly with each other includes, linking each of the multiple processor chips with a plurality of fabric chips.

13. The method of claim 12, wherein transaction requests can be independently sent out through the plurality of fabric chips.

14. The method of claim 12, wherein a remote direct memory access protocol is implemented through communication links between the multiple processor chips.

15. The method of claim 10, wherein the method operation of interleaving the segments across each memory associated with each processor chip alleviates hot spot contention.

16. The method of claim 10, further including:

detecting an error when accessing data from the semiconductor based memory, the error rendering the data unavailable; and recreating the unavailable data from a different semiconductor based memory.

17. The method of claim 16, wherein the method operation of recreating the unavailable data from a different semiconductor based memory includes, accessing the different semiconductor based memory through one of the plurality of redundant communication paths;

performing an exclusive OR operation on data within the different semiconductor based memory; and recovering the unavailable data.

18. The method of claim 16, wherein the different semiconductor based memory functions as a parity block.

19. The method of claim 10, wherein the semiconductor based memory is dynamic random access memory.

20. The method of claim 10, wherein the multiple processor chips are configured to execute a server application.

* * * * *